(12) United States Patent
Isozaki et al.

(10) Patent No.: US 7,345,125 B2
(45) Date of Patent: Mar. 18, 2008

(54) SILICONE RESIN COMPOSITION AND MOLDED PRODUCT THEREOF

(75) Inventors: Masayoshi Isozaki, Chiba (JP); Takashi Saito, Chiba (JP); Hideki Andoh, Chiba (JP)

(73) Assignee: Nippon Steel Chemical Co., Ltd., Tokyo (JP)

( * ) Notice: Subject to any disclaimer, the term of this patent is extended or adjusted under 35 U.S.C. 154(b) by 176 days.

(21) Appl. No.: 11/230,612

(22) Filed: Sep. 21, 2005

(65) Prior Publication Data

US 2006/0069216 A1    Mar. 30, 2006

(30) Foreign Application Priority Data

Sep. 27, 2004 (JP) .............................. 2004-279483

(51) Int. Cl.
*C08F 30/08* (2006.01)

(52) U.S. Cl. ...................... 526/279; 526/319; 526/321; 526/323.1; 526/323.2

(58) Field of Classification Search ..................... None
See application file for complete search history.

(56) References Cited

U.S. PATENT DOCUMENTS 7,198,639 B2 * 4/2007 Lai et al. .................... 623/6.11
2004/0163570 A1 * 8/2004 Vanmaele et al. ......... 106/31.13

FOREIGN PATENT DOCUMENTS

| JP | 08-048734   | A | 2/1996 |
| JP | 2002-256033 | A | 9/2002 |
| JP | 2002-363414 | A | 12/2002 |
| JP | 2003-315959 |   | * 6/2003 |
| JP | 2004-143449 | A | 5/2004 |

OTHER PUBLICATIONS

Machine translation of JP 2004-143449.*

"Structure-Property Relationships in Organic-Inorganic Nanomaterials Based on Methacryl-POSS and Dimethacrylate Networks", Bizet et al., Macromolecules, 2006, 39, 2574-2583.*
Hydrosilylation of allyl Alcohol with [HSiMe2OSi1.5]8: Octa(3-hydroxypropyldimethylsiloxy)octasilsesquioxane and its Octamethacrylate Derivative as Potential Precursors to Hybrid Nanocomposites, Zhang et al., J. Am. Chem. Soc. 2000, 122, 6979-6988.*
Abstract for "Organic/Inorganic Hybrid Materials Based on Silsesquioxanes Derived from (3-methacryloxypropyl)trimethoxysilane and Their Blends with Vinyl Ester Resins" Fanovich et al., Journal of sol Gel Science and Technology (2002), 23(1), 43-52.*

* cited by examiner

*Primary Examiner*—Marc S. Zimmer
(74) *Attorney, Agent, or Firm*—Cheng Law Group PLLC

(57) ABSTRACT

The present invention relates to a silicone resin composition that can be used for a roll film having small birefringence, the silicone resin composition being suitable for, for example, optical applications, and a window material for an automobile, the silicone resin composition having high heat resistance, the silicon resin composition being stained at a low level, the silicone resin composition having a low thermal expansion coefficient, the silicone resin composition enabling a transparent conductive film to be stably formed, and the silicone resin composition providing good winding property. The silicone resin composition contains: A) a silicone resin mainly composed of a polyorganosilsesquioxane having a cage-type structure in a structural unit, the polyorganosilsesquioxane being represented by $[RSiO_{3/2}]_n$ (wherein R is an organic functional group having a (meth)acryloyl group and n is 8, 10, or 12); B) an oligomer that is radically copolymerizable with the silicone resin, the oligomer containing an unsaturated group represented by $—R_3—CR^4=CH_2$ or $—CR^4=CH_2$ in a molecule, and the oligomer having a urethane bond; and C) an other unsaturated compound that is radically copolymerizable with the silicone resin. In the silicone resin composition, the silicone resin, the oligomer, and the other unsaturated compound are compounded at a weight ratio of 5 to 80:1 to 50:0 to 80.

8 Claims, No Drawings

SILICONE RESIN COMPOSITION AND MOLDED PRODUCT THEREOF

FIELD OF THE INVENTION

The present invention relates to a silicone resin composition and a molded product thereof. More specifically, the present invention relates to: a silicone resin composition that can be used for a transparent conductive film, which has excellent heat resistance, low thermal expansion property, excellent transparent and colorless properties, and low birefringence, for use in a transparent touch panel or an inner touch panel; and a molded product thereof.

BACKGROUND OF THE INVENTION

In general, films made of polyethylene terephthalate, polycarbonate, an alicyclic hydrocarbon polymer, and the like have been conventionally used for touch panels. However, their insufficient heat resistance, their thermal expansion coefficients, and their large birefringence have been problematic. Transparent conductive films using the above materials and touch panels using the conductive films have also involved problems such as insufficient heat resistance, thermal expansion coefficients, and large birefringence. On the other hand, high heat resistant polymers such as polyimide, polyether sulfone, polyether ketone, polyallylate, and a liquid crystal polymer are generally excellent in heat resistance, chemical resistance, and electrical insulating properties, but can find use in limited applications in the field of optics.

JP 2004-143449 A is a document relating to the present invention.

By the way, the cage-type polyorganosilsesquioxane represented by a formula $(RSiO_{3/2})_n$ has been described in JP 2004-143449 A. The document also describes that the cage-type polyorganosilsesquioxane can be used as a mixture with another resin. In the formula, R represents an organic functional group containing an acryloyl group or the like, and n represents 8, 10, 12, or 14.

SUMMARY OF THE INVENTION

An object of the present invention is to provide a silicone resin composition that can be used for a roll film for use in, for example, a touch panel having small birefringence, the silicone resin composition having high heat resistance, the silicon resin composition being stained at an extremely low level, the silicone resin composition having a low thermal expansion coefficient, the silicone resin composition enabling a transparent conductive film to be stably formed, and the silicone resin composition providing good winding property even when it is made into a roll shape.

The inventors of the present invention have made extensive studies on the thermal, mechanical, and optical properties of a resin to be used for a film. As a result, we have found that the above object can be achieved, thereby completing the present invention.

That is, according to one aspect of the present invention, there is provided a silicone resin composition, comprising:

A) a silicone resin mainly composed of a polyorganosilsesquioxane having a cage-type structure in a structural unit, the polyorganosilsesquioxane being represented by a general formula (1)

$$[RSiO_{3/2}]_n \quad (1)$$

where

R represents an organic functional group having a (meth)acryloyl group and n represents 8, 10, or 12;

B) an oligomer that is radically copolymerizable with the silicone resin, the oligomer containing at least one unsaturated group represented by $—R^3—CR^4=CH_2$ or $—CR^4=CH_2$ (provided that $R^3$ represents an alkylene group, an alkylidene group, or a —OCO— group, and $R^4$ represents hydrogen or an alkyl group) in a molecule, the oligomer having a number average molecular weight of 2,500 or more, and the oligomer having a urethane bond, and C) an other unsaturated compound that is radically copolymerizable with the silicone resin, in which the silicone resin, the oligomer, and the other unsaturated compound are compounded at a weight ratio of 5 to 80:1 to 50:0 to 80.

Here, an example of the unsaturated compound that is radically copolymerizable with the silicone resin includes an alicyclic unsaturated compound 10 to 100 wt % of which is represented by the following general formula (2).

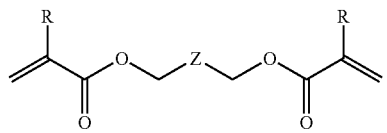

(2)

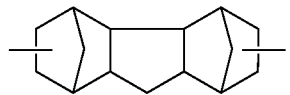

(2a)

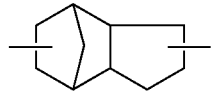

(2b)

where

Z represents any group represented by the formula (2a) or (2b), and R represents hydrogen or a methyl group.

According to another aspect of the present invention, there is provided a silicone resin copolymer or silicone resin molded product obtained by radically copolymerizing the silicone resin composition. The silicone resin molded product desirably satisfies the following conditions (a) to (d).

(a) A glass transition temperature of 300° C. or higher.
(b) A linear expansion coefficient of 70 ppm/K or less.
(c) A transmittance of visible light having a wavelength of 400 to 800 nm of 85% or more.
(d) A birefringence of 1.0 nm or less.

According to another aspect of the present invention, there is provided a method of producing a silicone resin molded product, including heating the silicone resin composition, or irradiating the silicone resin composition with an energy ray, to radically copolymerize the silicone resin composition.

DETAILED DESCRIPTION OF THE INVENTION

The silicone resin composition of the present invention contains, as essential ingredients, A) the silicone resin represented by the general formula (1) (which may hereinafter be referred to as the Silicone Resin), B) the oligomer having a urethane bond (which may hereinafter be referred to as the Oligomer), and C) the unsaturated compound (which may hereinafter be referred to as the Unsaturated Compound), and is used as a main component of a resin component (excluding a solvent and a filler and including a polymerizable component). A molded product such as a film can be obtained by radically copolymerizing the silicone resin composition of the present invention. The molded product of the present invention can be obtained by molding and curing the silicone resin composition, or by molding a silicone resin copolymer thereof. The silicone resin copolymer of the present invention is a cross-linked copolymer, and the same molding and curing method as that for a thermosetting resin can be adopted in this case.

The Silicone Resin to be used in the present invention is mainly composed of a polyorganosilsesquioxane having a cage-type structure in a structural unit, the polyorganosilsesquioxane being represented by the general formula (1) (which may hereinafter be referred to as the cage-type polyorganosilsesquioxane).

In the general formula (1), R represents an organic functional group having a (meth)acryloyl group and n represents 8, 10, or 12. R preferably represents an organic functional group represented by the following general formula (4). In the general formula (4), m represents an integer of 1 to 3 and $R_1$ represents a hydrogen atom or a methyl group. It should be noted that the general formula (4) can also be represented in the form of $CH_2$=$CR_1$—COO—$(CH_2)_m$—.

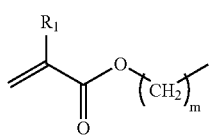
(4)

The Silicone Resin has a reactive functional group on a silicon atom in a molecule. Specific structures of the cage-type polyorganosilsesquioxane where n in the general formula (1) represents 8, 10, or 12 include such cage-type structures as represented by the following structural formulae (5), (6), and (7). It should be noted that R in each of the following formulae has the same meaning as that of R in the general formula (1).

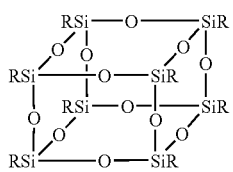
(5)

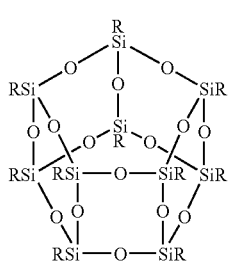
(6)

-continued

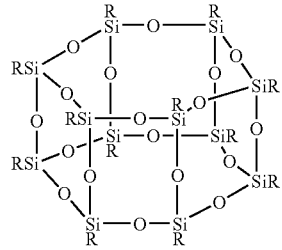
(7)

The Silicone Resin can be produced by means of the method described in JP 2004-143449 A. For example, the Silicone Resin can be produced by: hydrolyzing a silicon compound represented by $RSiX_3$ in the presence of a polar solvent and a basic catalyst while condensing part of the silicon compound; and condensing the resultant hydrolysate again in the presence of a nonpolar solvent and a basic catalyst. Here, R represents an organic functional group having a (meth)acryloyl group and X represents a hydrolyzable group. R preferably represents a group represented by the general formula (4). Specific examples of preferable R include a 3-methacryloxypropyl group, a methacryloxymethyl group, and a 3-acryloxypropyl group.

The hydrolyzable group X is not particularly limited as long as it is a group having hydrolyzability. Examples thereof include an alkoxyl group and an acetoxy group of those, an alkoxyl group is preferable. Examples of the alkoxyl group include a methoxy group, an ethoxy group, n- and iso-propoxygroups, and n-, iso-, and t-butoxy groups. A methoxy group is preferable because of its high reactivity.

Examples of a preferable compound out of the silicon compounds each represented by $RSiX_3$ include methacryloxymethyltriethoxysilane, methacryloxymethyltrimethoxysilane, 3-methacryloxypropyltrichlorosilane, 3-methacryloxypropyltrimethoxysilane, 3-methacryloxypropyltriethoxysilane, 3-acryloxypropyltrimethoxysilane, and 3-acryloxypropyltrichlorosilane. Of those, 3-methacryloxypropyltrimethoxysilane is preferably used because a raw material therefor is easily available.

Examples of a basic catalyst to be used for a hydrolysis reaction include: alkali metal hydroxides such as potassium hydroxide, sodium hydroxide, and cesium hydroxide; and ammonium hydroxide salts such as tetramethylammonium hydroxide, tetraethylammonium hydroxide, tetrabutylammonium hydroxide, benzyltrimethylammonium hydroxide, and benzyltriethylammonium hydroxide. Of those, tetramethylammonium hydroxide is preferably used because of its high catalytic activity. The basic catalyst is generally used in the form of an aqueous solution.

The hydrolysis reaction is performed at a temperature of preferably 0 to 60° C., or more preferably 20 to 40° C. A reaction temperature of lower than 0° C. lowers a reaction rate, with the result that the hydrolyzable group remains in an unreacted state to thereby lengthen a reaction time. On the other hand, a reaction temperature in excess of 60° C. results in so high a reaction rate that a complicated condensation reaction proceeds to promote an increase in molecular weight of a hydrolysate. In addition, a reaction time is preferably 2 hours or longer. A reaction time of shorter than 2 hours prevents the hydrolysis reaction from proceeding sufficiently, with the result that the hydrolyzable group remains in an unreacted state.

The presence of water is essential to the hydrolysis reaction. Water may be supplied from an aqueous solution of the basic catalyst, or may be added separately. The amount of water is equal to or larger than an amount that suffices for the hydrolysis of the hydrolyzable group, and is preferably 1.0 to 1.5 time equivalents of the theoretical amount. It is also necessary to use an organic polar solvent at the time of hydrolysis, and examples of an available organic solvent include: alcohols such as methanol, ethanol, and 2-propanol; and other organic polar solvents. Lower alcohols each having 1 to 6 carbon atoms and soluble in water are preferably used, and 2-propanol is more preferably used. The use of a nonpolar solvent is not preferable because a reaction system does not become uniform, the hydrolysis reaction does not proceed sufficiently, and an unreacted alkoxyl group remains.

After the completion of the hydrolysis reaction, water or a water-containing reaction solvent is separated. Methods such as evaporation under reduced pressure can be adopted for separating water or the water-containing reaction solvent. For example, a method can be adopted for sufficiently removing water and other impurities, which involves: adding a nonpolar solvent to dissolve a hydrolysate; washing the solution with a salt solution or the like; and drying the resultant with a drying agent such as anhydrous magnesium sulfate. The hydrolysate can be recovered by separating the nonpolar solvent through evaporation or the like. However, there is no need to separate the nonpolar solvent if the nonpolar solvent can be used for a subsequent reaction.

The hydrolysis reaction involves the condensation reaction of a hydrolysate as well as hydrolysis. A hydrolysate involving a condensation reaction is generally a colorless viscous liquid having a number average molecular weight of 1,400 to 5,000. The hydrolysate is an oligomer having a number average molecular weight of 1,400 to 3,000, although the number average molecular weight varies depending on a reaction condition. Most, or preferably nearly all, of the hydrolyzable groups X are substituted by OH groups, and most of, or preferably 95% or more, of the OH groups are condensed. The structure of the hydrolysate is selected from multiple kinds of cage-type, ladder-type, and random-type silsesquioxanes. A ratio of compounds having complete cage-type structures to the compounds having cage-type structures is low, and the compounds are mainly composed of compounds each having an incomplete cage-type structure in which part of a cage is open. Therefore, the hydrolysate obtained as a result of the hydrolysis is heated in an organic solvent in the presence of a basic catalyst to condense (referred to as recondense) a siloxane bond, whereby a silsesquioxane having a cage-type structure is selectively produced.

After water or the water-containing reaction solvent has been separated, a recondensation reaction is performed in the presence of a nonpolar solvent and a basic catalyst. The recondensation reaction is performed at a temperature of preferably 100 to 200° C., or more preferably 110 to 140° C. An excessively low reaction temperature does not provide a driving force sufficient for causing the recondensation reaction, so the reaction dose not proceed. On the other hand, an excessively high reaction temperature may cause a (meth) acryloyl group to undergo a self-polymerization reaction, so the reaction temperature must be lowered or a polymerization inhibitor must be added. A reaction time is preferably 2 to 12 hours. The amount of the nonpolar solvent to be used desirably suffices for dissolving the hydrolysate, and the amount of the basic catalyst to be used is in the range of 0.1 to 10 wt % with respect to the hydrolysate.

The nonpolar solvent has only to be insoluble or nearly insoluble in water, but a hydrocarbon-based solvent is preferable. Examples of such hydrocarbon-based solvent included on polar solvents each having a low boiling point such as toluene, benzene, and xylene. Of those, toluene is preferably used. A basic catalyst to be used for the hydrolysis reaction can be used, and examples thereof include: alkali metal hydroxides such as potassium hydroxide, sodium hydroxide, and cesium hydroxide; and ammonium hydroxide salts such as tetramethylammonium hydroxide, tetraethylammonium hydroxide, tetrabutylammonium hydroxide, benzyltrimethylammonium hydroxide, and benzyl triethyl ammonium hydroxide. Of those, a catalyst soluble in the nonpolar solvent such as a tetraalkylammonium is preferable.

The hydrolysate is preferably washed with water, dehydrated, and concentrated before being recondensed, but may be recondensed without being washed with water or dehydrated. At the time of the reaction, water may be present, but there is no need to actively add water. The amount of water is desirably about an amount supplied by a basic catalyst solution. When the hydrolysate is not hydrolyzed sufficiently, water in an amount equal to or larger than the theoretical amount necessary for hydrolyzing a remaining hydrolyzable group is needed. However, in general, the hydrolysis reaction is sufficiently performed. After the recondensation reaction, the catalyst is washed with water and removed, followed by concentration. Thus, a silsesquioxane mixture is obtained.

70% or more of the entire silsesquioxane thus obtained is constituted by multiple kinds of cage-type silsesquioxanes, although the ratio varies depending on a reaction condition and the state of the hydrolysate. 20 to 40% of the multiple kinds of cage-type silsesquioxanes are constituted by T8 represented by the general formula (5), 40 to 50% thereof by T10 represented by the general formula (6), and the balance being T12 represented by the general formula (7). T8 can be precipitated and separated as a needle-like crystal by leaving a siloxane mixture at 20° C. or lower.

The Silicone Resin to be used in the present invention may be a mixture of T8 to T12, or maybe obtained by separating or condensing 1 or 2 such as T8 from the mixture. The Silicone Resin to be used in the present invention is not limited to a silicone resin produced by means of the above method.

The Oligomer to be used in combination with the Silicone Resin in the silicone resin composition of the present invention is an oligomer that is radically copolymerizable with the Silicone Resin, the oligomer containing at least one unsaturated group represented by $R^3$—$CR^4$=$CH_2$ or —$CR^4$=$CH_2$ in a molecule, the oligomer having a number average molecular weight of 2,500 or more, and the oligomer having a urethane bond. Here, $R^3$ represents an alkylene group, an alkylidene group, or a —OCO— group, and the alkylene group and the alkylidene group are preferably lower alkylene and alkylidene groups each having 1 to 6 carbon atoms. $R^4$ represents hydrogen or an alkyl group, and preferably represents hydrogen or a methyl group. At least one kind selected from the group consisting of an acryloyl group, a methacryloyl group, an allyl group, and a vinyl group can be exemplified as a preferable unsaturated group.

The Oligomer can be produced by means of a method that has been conventionally and generally used. In other words, the oligomer can be produced by means of, for example, a method involving synthesizing the Oligomer from a polyol, a polyisocyanate, and a compound having a polymerizable unsaturated group and a hydroxyl group at its terminals. At this time, urethane acrylate that can be used for the resin composition of the present invention can be obtained by appropriately adjusting the molecular weights of, or a molar ratio at the time of a reaction between, raw material substances.

Examples of the polyol include: a polyester polyol obtained by polycondensation of a polybasic acid and a polyhydric alcohol; a polyester polyol obtained by ring-opening polymerization of a lactone such as e-caprolactone or ?-valerolactone; an alkylene oxide such as ethylene oxide, propylene oxide, or butylene oxide; and a polyether polyol as a polymer of cyclic ethers such as an alkyl-substituted tetrahydrofuran or as a copolymer of two or more kinds of the cyclic ethers.

Examples of the polyisocyanate compound include: 2,4-tolylene diisocyanate; 2,6-tolylene diisocyanate; 4,4'-diphenylmethane diisocyanate; hydrogenated 4,4'-diphenylmethane diisocyanate; xylilene diisocyanate; hydrogenated xylilene diisocyanate; hexamethylene diisocyanate; isophorone diisocyanate; 1,5-naphthalene diisocyanate; tolidine diisocyanate; p-phenylene diisocyanate; trans-cyclohexane-1,4-diisocyanate; lysine diisocyanate; tetramethylxylene diisocyanate; lysine ester triisocyanate; 1,6,11-undecane triisocyanate; 1,8-diisocyanate-4-isocyanate methyl octane; 1,3,6-hexamethylene triisocyanate; bicycloheptane triisocyanate; trimethylhexamethylene diisocyanate; dicyclopentadiene diisocyanate; and norbornene diisocyanate.

Examples of the compound having a polymerizable unsaturated group and a hydroxyl group at its terminals include: 2-hydroxyethyl (meth)acrylate; 2-hydroxypropyl (meth) acrylate; 2-hydroxy-3-phenoxypropyl (meth)acrylate; 2-(meth)acryloyloxyethyl-2-hydroxyethylphthalic acid; pentaerythritol tri(meth)acrylate; 3-acryloyloxyglycerin mono(meth)acrylate; 2-hydroxybutyl (meth)acrylate; 2-hydroxy-1-(meth)acryloxy-3-(meth)acryloxypropane; glycerin di(meth)acrylate; polypropylene glycol mono(meth)acrylate; polyethylene glycol mono(meth)acrylate; poly e-caprolactone mono(meth)acrylate; 4-hydroxybutyl (meth)acrylate; e-caprolactone mono(meth)acrylate; and various epoxy acrylates.

The Oligomer maybe a commercially available one, and examples of a commercial product preferably used therefor include urethane acrylate oligomers UF-8001 (having a number average molecular weight of 2,600) and UF-503 (having a number average molecular weight of 3,800) manufactured by KYOEISHA CHEMICAL Co., Ltd.

The Unsaturated Compound to be used for the silicone resin composition of the present invention is an unsaturated compound except the Oligomer, and is copolymerizable with the Silicone Resin. The Unsaturated Compound is not limited as long as it satisfies the above conditions, but a low-water-absorbing molded product can be obtained by incorporating at least 10 to 100 wt % of an alicyclic unsaturated compound into the Unsaturated Compound. The alicyclic unsaturated compound is preferably one represented by the general formula (2). Preferable examples of a non-alicyclic unsaturated compound as an unsaturated compound except the alicyclic unsaturated compound include a chain unsaturated compound and an aromatic unsaturated compound.

A specific example of the alicyclic unsaturated compound represented by the general formula (2) in the case where Z is a group represented by the formula (2a) includes pentacyclo[6.5.1.1$^{3,6}$.0$^{2,7}$.0$^{9,13}$]pentadecanedimethylol diacrylate where R represents hydrogen, and a specific example thereof in the case where Z is a group represented by the formula (2b) includes dicyclopentanyl diacrylate (or tricyclo [5.2.1.0$^{2,6}$]decanedimethylol diacrylate) where R represents hydrogen.

The Unsaturated Compounds are roughly classified into: a reactive oligomer as a polymer having the number of repetition of structural units of about 2 to 20; and a reactive monomer having a low molecular weight and a low viscosity. The Unsaturated Compounds are roughly classified into: a monofunctional unsaturated compound having one unsaturated group; and a polyfunctional unsaturated group having two or more unsaturated groups. An extremely small amount of a polyfunctional unsaturated compound (about 1% or less) is desirably incorporated in order to obtain a good three-dimensional cross-linked body. The number of functional groups per molecule is 1.1 or more, preferably 1.5 or more, or more preferably 1.6 to 5 on average when one requests a copolymer to have heat resistance, strength, and the like. To this end, a monofunctional unsaturated compound and a polyfunctional unsaturated compound having 2 to 5 unsaturated groups are desirably used as a mixture to adjust the average number of functional groups.

Examples of the reactive oligomer include epoxy acrylate, epoxydized oil acrylate, urethane acrylate, unsaturated polyester, polyester acrylate, polyether acrylate, vinyl acrylate, polyene/thiol, silicone acrylate, polybutadiene, and polystyrylethylmethacrylate. The reactive monomers are classified into a monofunctional unsaturated compound and a polyfunctional unsaturated compound.

Examples of a reactive monofunctional monomer include styrene, vinyl acetate, N-vinylpyrrolidone, butyl acrylate, 2-ethylhexyl acrylate, n-hexyl acrylate, cyclohexyl acrylate, n-decyl acrylate, isobonyl acrylate, dicyclopentenyloxyethyl acrylate, phenoxyethyl acrylate, and trifluoroethyl methacrylate.

Examples of a reactive polyfunctional monomer include unsaturated compounds except an unsaturated compound represented by the general formula (2) such as: tripropylene glycol diacrylate; 1,6-hexaenediol diacrylate; bisphenol A diglycidyl ether diacrylate; tetraethylene glycol diacrylate; hydroxypivalic acid neopentyl glycol diacrylate; trimethylolpropane triacrylate; pentaerythritol triacrylate; pentaerythritol tetraacrylate; and dipentaerythritol hexaacrylate.

In addition to those exemplified above, each of various reactive oligomers and monomers can be used as the Unsaturated Compound. Each of those reactive oligomers and monomers may be used alone, or two or more of them may be used as a mixture.

The silicone resin composition of the present invention is mainly composed of A) the Silicone Resin, B) the Oligomer, and C) the Unsaturated Compound. A mixing ratio (weight ratio) among them is 5 to 80:1 to 50:0 to 80, or preferably 10 to 70:5 to 40 10 to 70. A ratio of the Silicone Resin of less than 5% is not preferable because the physical property values of a molded product after curing such as heat resistance, transparency, and water absorbing property reduce. A ratio of the Silicone Resin in excess of 80% is not preferable either because the composition has an increased viscosity to make it difficult to produce a molded product. Incorporating 1 to 50 wt % of the Oligomer allows the composition to be molded into a roll with good winding property. A ratio of the Oligomer in excess of 50% is not preferable because compatibility with the Silicone Resin becomes poor and a uniform resin composition cannot be obtained. A copolymer obtained when the ratio of the Silicone Resin is large has physical properties of a silicone resin dominant over those of other components. A copolymer obtained when the ratio of the Unsaturated Compound is large has physical properties of a resin formed of an unsaturated compound dominant over those of other components, and several of its drawbacks are alleviated. A copolymer obtained when the ratio of an alicyclic unsaturated compound is large has low water absorbing property, and a copolymer obtained when the ratio of a non-alicyclic polyfunctional unsaturated compound is large has low linear expansion property. However, when A) the Silicone Resin, B) the oligomer, and C) the Unsaturated Compound are used, the value (wt %) calculated from the expression C/(B +C) is desirably 50 or less, or preferably 20 or less.

A silicone resin copolymer can be obtained by radically copolymerizing the silicone resin composition of the present invention. The silicone resin composition of the present invention can be compound with various additives for improving the physical properties of the silicone resin copolymer, for promoting radical copolymerization, and for other purposes. Examples of an additive that promotes a reaction include a thermal polymerization initiator, a thermal polymerization accelerator, a photopolymerization initiator, an auxiliary photoinitiator, and a sensitizer. When a photo polymerization initiator or a thermal polymerization initiator is compound, the addition amount of the initiator is desirably in the range of 0.1 to 5 parts by weight, or preferably in the range of 0.1 to 3 parts by weight with respect to 100 parts by weight in total of the silicone resin and the unsaturated compound. An addition amount of less than 0.1 part by weight causes the composition to be insufficiently cured, so a molded product to be obtained will have low strength and low rigidity. On the other hand, an addition amount in excess of 5 parts by weight may cause problems such as the staining of a molded product.

Examples of a photopolymerization initiator that can be suitably used in the case where the silicone resin composition is to be provided as a photo-curable composition include acetophenone-based, benzoin-based, benzophenone-based, thioxanthone-based, and acyl phosphine oxide-based compounds. Specific examples thereof include: trichloroacetophenone; diethoxyacetophenone; 1-phenyl-2-hydroxy-2-methylpropan-1-one; 1-hydroxycyclohexyl phenyl ketone; 2-methyl-1-(4-methylthiophenyl)-2-morpholinopropan-1-one; benzoin methyl ether; benzyl dimethyl ketal; benzophenone; thioxanthone; 2,4,6-trimethylbenzoyl-diphenylphosphineoxide; methyl phenyl glyoxylate; camphor quinone; benzyl; anthraquinone; and Michler's ketone. An auxiliary photoinitiator or a sensitizer may be used in combination with the photopolymerization initiator to exert an effect.

The silicone resin composition of the present invention can be added with various additives without departing from an object of the present invention. Examples of the various additives include organic/inorganic fillers, plasticizers, flame retardants, heat stabilizers, antioxidants, light stabilizers, UV absorbers, lubricants, antistatic agents, releasing agents, foaming agents, nucleating agents, coloring agents, cross-linking agents, dispersing agents, and resin components.

A silicone resin copolymer can be obtained by radically copolymerizing the silicone resin composition of the present invention. Alternatively, a molded product of a silicone resin copolymer can be obtained by: forming the silicone resin composition into a predetermined shape; and radically copolymerizing the resultant. When a silicone resin copolymer to be obtained is thermoplastic, any one of various molding methods can be adopted. However, when the number of reactive substituents or unsaturated groups per molecule exceeds 1.0, the copolymer has a three-dimensional cross-linked structure, so molding and curing is generally adopted. In view of the above, radical copolymerization is also referred to as curing. Heating or irradiation with an energy ray such as an electron beam or an ultraviolet ray is appropriately adopted for radical copolymerization.

The silicone resin copolymer of the present invention can be produced by heating a silicone resin composition containing a radical polymerization initiator, or irradiating the composition with light, to cure the composition. When the copolymer (molded product) is to be produced through heating, appropriate selection of a thermal polymerization initiator and an accelerator allows the molding temperature for the composition to be selected from a wide range from room temperature to around 200° C. In this case, a silicone resin molded product having a desired shape can be obtained by polymerizing and curing the composition in a die or on a steel belt.

When the copolymer (molded product) is to be produced through irradiation with light, the molded product can be produced by irradiating the composition with ultraviolet light having a wavelength of 10 to 400 nm or visible light having a wavelength of 400 to 700 nm. The wavelength of light to be used is not particularly limited, but near ultraviolet light having a wavelength of 200 to 400 nm is suitably used. Examples of a lamp to be used as an ultra violet light emission source include a low-pressure mercury lamp (having an output of 0.4 to 4 W/cm), a high-pressure mercury lamp (having an output of 40 to 160 W/cm), an ultra high-pressure mercury lamp (having an output of 173 to 435 W/cm), a metal halide lamp (having an output of 80 to 160 W/cm), a pulse xenon lamp (having an output of 80 to 120 W/cm), and an electrode less discharge lamp (having an output of 80 to 120 W/cm). Since those ultraviolet lamps each have characteristic spectral distribution, so they are selected depending on the kind of photoinitiator to be used.

Examples of a method of obtaining the silicone resin copolymer (molded product) through irradiation with light include: a method involving injecting the composition into a die having an arbitrary cavity shape and composed of a transparent material such as quartz glass, irradiating the composition with ultraviolet light emitted from any one of the above ultraviolet lamps for polymerization and curing, and taking the resultant out of the die to produce a molded product having a desired shape; and a method without the aid of a die involving applying the silicone resin composition of the present invention to, for example, a moving steel belt by means of a doctor blade or a roll-shaped coater, and polymerizing and curing the composition by means of any one of the above ultraviolet lamps to produce a sheet-like molded product.

The silicone resin copolymer (molded product) thus obtained has a glass transition temperature measured by means of a dynamic thermomechanical analyzer in excess of 300° C., so a substrate can be treated at high temperature in, for example, the deposition of a thin film. In addition, the copolymer has a linear expansion coefficient of preferably 70 ppm/K or less, or more preferably 65 ppm/K or less because a difference in linear expansion coefficient between the copolymer and a member around it becomes small, which is advantageous of dimensional stability. Furthermore, a vivid image having no distortion can be obtained when the copolymer is turned into a display member having a transmittance of visible light having a wavelength of 400 to 800 nm of 85% or more, or preferably 90% or more, and a birefringence of 1.0 nm or less, or preferably 0.8 nm or less.

According to the present invention, a molded product having high heat resistance, high transparency, and high dimensional stability can be obtained, and the molded product can find use in a wide variety of applications including: optical applications such as a touch panel substrate, a flat panel display substrate, a lens, an optical disk, and an optical fiber; and window materials for various transport machines, houses, and the like. The molded product is a transparent member having a light weight and a high impact strength, and can be vigorously used as an alternative to glass, so it has great industrial applicability.

EXAMPLES

Hereinafter, examples of the present invention will be shown. Silicone resins used for the following examples were synthesized in accordance with the following synthesis examples.

Synthesis Example 1

40 ml of 2-propanol (IPA) as a solvent and a 5% aqueous solution of tetramethylammonium hydroxide (an aqueous solution of TMAH) as a basic catalyst were fed into a reaction vessel equipped with a stirring device, a dropping funnel, and a temperature gauge. 15 ml of IPA and 12.69 g of 3-methacryloxypropyltrimethoxysilane (MTMS: SZ-6300 manufactured by Dow Corning Toray Co., Ltd.) were fed into the dropping funnel, and a solution of MTMS in IPA was added dropwise over 30 minutes at room temperature while the mixture in the reaction vessel was stirred. After the dropwise addition of MTMS, the mixture was stirred for 2 hours without being heated. After the stirring for 2 hours, the solvent was distilled off under reduced pressure, and the remainder was dissolved into 50 ml of toluene. After the reaction liquid had been washed a saturated salt solution so as to be neutral, the resultant was dehydrated with anhydrous magnesium sulfate. Anhydrous magnesium sulfate was filtered out and the remainder was concentrated to produce 8.6 g of a hydrolysate (silsesquioxane). The silsesquioxane was a colorless viscous liquid soluble in various organic solvents.

20.65 g of the silsesquioxane thus obtained, 82 ml of toluene, and 3.0 g of a 10% aqueous solution of TMAH were fed into a reaction vessel equipped with a stirring device, a dienstag, and a cooling pipe, and the whole was gradually heated to distill water off. The remainder was additionally heated to 130° C. to perform a recondensation reaction at a reflux temperature of toluene. The temperature of a reaction liquid at this time was 108° C. After the reflux of toluene, the resultant was stirred for 2 hours, and then the reaction was terminated. After the reaction liquid had been washed with a saturated salt solution so as to be neutral, the resultant was dehydrated with anhydrous magnesium sulfate. Anhydrous magnesium sulfate was filtered out and the remainder was concentrated to produce 18.77 g of a cage-type silsesquioxane (mixture) as a target product. The resultant cage-type silsesquioxane was a colorless viscous liquid soluble in various organic solvents.

Mass analysis was performed after separation of the reactant by means of liquid chromatography after the recondensation reaction. As a result, molecular ions obtained by bonding ammonium ions to the molecular structures represented by the structural formulae (5), (6), and (7) were observed, and a component ratio T8: T10: T12: balance was about 2:4:1:3. The analysis confirmed that the reactant was a silicone resin mainly composed of a cage-type structure.

Example 1

25 parts by weight of the cage-type silicone resin, which had been synthesized in Synthesis Example 1, having methacryloyl groups on all silicon atoms, 10 parts by weight of trimethylolpropane triacrylate, 60 parts by weight of dicyclopentanyl diacrylate, 5 parts by weight of a urethane acrylate oligomer 1, and 2.5 parts by weight of 1-hydroxycyclohexyl phenyl ketone as a photopolymerization initiator were mixed to produce a transparent silicone resin composition.

Next, the silicone resin composition was cast by means of a roll coater to have a thickness of 0.2 mm, and was cured by means of a high-pressure mercury lamp of 30 W/cm at an integrated exposure value of 2,000 mJ/cm$^2$ to produce a sheet-like silicone resin molded product having a predetermined thickness.

Examples 2 to 5 and Comparative Examples 1 to 3

In each of Examples 2 to 5 and Comparative Examples 1 to 3, a resin molded product was produced in the same manner as in Example 1 except that the composition was changed to a weight ratio shown in Table 1. Table 2 summarizes the physical property values of the resultant molded products.

The abbreviations in the table have the following meanings.
A: Compound synthesized in Synthesis Example 1
B: Trimethylolpropane triacrylate
C: Dicyclopentanyl diacrylate (Light Acrylate DCP-A manufactured by KYOEISHA CHEMICAL Co., Ltd: Z is (a2) and R is H in the general formula (2))
D: Urethane acrylate oligomer 1 (UF-8001 manufactured by KYOEISHA CHEMICAL Co., Ltd having a number average molecular weight of about 2,600)
E: Urethane acrylate oligomer 2 (UF-503 manufactured by KYOEISHA CHEMICAL Co., Ltd having a number average molecular weight of about 3,800)
F: Urethane acrylate oligomer 3 (UA-102A manufactured by Shin-Nakamura Chemical Co., Ltd having a number average molecular weight of about 1,200)
G: 1-hydroxycyclohexyl phenyl ketone (polymerization initiator)

TABLE 1

| | A | B | C | D | E | F | G |
|---|---|---|---|---|---|---|---|
| Example | | | | | | | |
| 1 | 25 | 10 | 60 | 5 | — | | 2.5 |
| 2 | 25 | 10 | 55 | 10 | — | | 2.5 |
| 3 | 30 | — | 65 | — | 5 | | 2.5 |
| 4 | 30 | 10 | 55 | — | 5 | | 2.5 |
| 5 | 50 | 35 | 10 | 5 | — | | 2.5 |
| Comparative Example 1 | 25 | — | 75 | — | — | | 2.5 |
| 2 | 25 | 10 | | 65 | | | 2.5 |
| 3 | 25 | 10 | 60 | | | 5 | 2.5 |

TABLE 2

| | Film formability | Tg (° C.) | CTE (ppm/K) | TLB (%) | Biref. (nm) |
|---|---|---|---|---|---|
| Example | | | | | |
| 1 | good | >300 | 58 | 91.2 | 0.3 |
| 2 | good | >300 | 60 | 91.5 | 0.5 |
| 3 | good | >300 | 65 | 91.8 | 0.3 |

TABLE 2-continued

| | Film form-ability | Tg (° C.) | CTE (ppm/K) | TLB (%) | Biref. (nm) |
|---|---|---|---|---|---|
| 4 | good | >300 | 60 | 91.2 | 0.4 |
| 5 | good | >300 | 56 | 91.6 | 0.3 |
| Comp. Example 1 | x | >300 | 78 | 92.0 | 0.4 |
| 2 | x | No uniform molded product is obtained | | | |
| 3 | x | >300 | 60 | 91.9 | 0.3 |

Various properties were measured according to the following methods.
1) Glass transition temperature (Tg): Dynamic thermomechanical analysis, rate of temperature increase 5° C./min, distance between chucks 10 mm
2) Linear expansion coefficient (CTE): Thermomechanical analysis, rate of temperature increase 5° C./min, compression load 0.1 N
3) Transmittance of all light beams (TLB): sample thickness 0.2 mm (reference specification JIS K 7361-1)
4) Birefringence (Biref.): Spectral ellipsometry: sample thickness 0.2 mm

What is claimed is:

1. A silicone resin composition comprising:
   A) a silicone resin mainly containing a polyorganosilsesquioxane having a cage-type structure in a structural unit, the polyorganosilsesquioxane being represented by a general formula (1), $$[RSiO_{3/2}]_n \quad (1)$$

wherein R represents an organic functional group having a (meth)acryloyl group and n represents 8, 10, or 12;
   B) an oligomer that is radically copolymerizable with the silicone resin, the oligomer containing at least one unsaturated group represented by one of $-R_3-CR^4=CH_2$ and $-CR^4=CH_2$ in a molecule wherein $R^3$ represents an alkylene group, an alkylidene group, or a $-OCO-$ group, and $R^4$ represents hydrogen or an alkyl group, the oligomer having a number average molecular weight of 2,500 or more, and the oligomer having a urethane bond, and
   C) an unsaturated compound that (i) is radically copolymerizable with the silicone resin, and (ii) comprises an alicyclic unsaturated compound 10 to 100 wt % of which is represented by the following general formula (2),

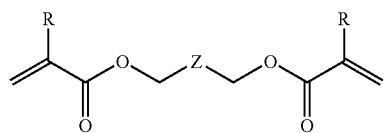

(2)

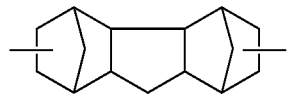

(2a)

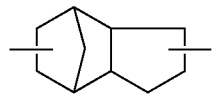

(2b)

wherein Z represents any group represented by the formula (2a) or (2b), and R represents hydrogen or a methyl group, and
   wherein the silicone resin (A), the oligomer (B), and the unsaturated compound (C) are compounded at a weight ratio of 5 to 80:1 to 50:0 to 80.

2. A silicone resin copolymer obtained by radically copolymerizing the silicone resin composition according to claim 1.

3. A silicone resin molded product obtained by radically copolymerizing in a mold the silicone resin composition according to claim 1.

4. The silicone, resin molded product according to claim 3, wherein the following conditions (a) to (d) are satisfied,
   (a) a glass transition temperature of 300° C. or higher,
   (b) a linear expansion coefficient of 70 ppm/K or less,
   (c) a transmittance of visible light having a wavelength of 400 to 800 nm of 85% or more, and
   (d) a birefringence of 1.0 nm or less.

5. A method of producing a silicone resin molded product, said method comprising radically copolymerizing the silicone resin composition according to claim 1, by either heating the silicone resin composition or irradiating the silicone resin composition with an energy ray.

6. A silicone resin molded product obtained by radically copolymerizing in a mold a silicone resin composition comprising:
   A) a silicone resin mainly containing a polyorganosilsesquioxane having a cage-type structure in a structural unit, the polyorganosilsesquioxane being represented by a general formula (1), $$[RSiO_{3/2}]_n \quad (1)$$

wherein R represents an organic functional group having a (meth)acryloyl group and n represents 8, 10, or 12;
   B) an oligomer that is radically copolymerizable with the silicone resin, the oligomer containing at least one unsaturated group represented by one of $-R_3-CR^4=CH_2$ and $-CR^4=CH_2$ in a molecule wherein $R^3$ represents an alkylene group, an alkylidene group, or a $-OCO-$ group, and $R^4$ represents hydrogen or an alkyl group, the oligomer having a number average molecular weight of 2,500 or more, and the oligomer having a urethane bond, and
   C) an unsaturated compound that is radically copolymerizable with the silicone resin, and
   wherein the silicone resin (A), the oligomer (B), and the unsaturated compound (C) are compounded at a weight ratio of 5 to 80:1 to 50:0 to 80, and
   wherein the silicone resin molded product satisfies the following conditions (a) to (d),
   (a) a glass transition temperature of 300° C. or higher,
   (b) a linear expansion coefficient of 70 ppm/K or less,
   (c) a transmittance of visible light having a wavelength of 400 to 800 nm of 85% or more, and
   (d) a birefringence of 1.0 nm or less.

7. The silicone resin molded product according to claim 6, wherein the unsaturated compound (C) that is radically copolymerizable with the silicone resin comprises an alicyclic unsaturated compound 10 to 100 wt % of which is represented by the following general formula (2), (2) 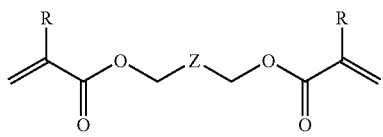

(2a) 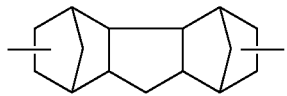

(2b) 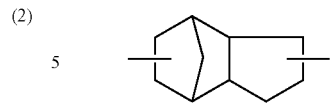

wherein Z represents any group represented by the formula (2a) or (2b), and R represents hydrogen or a methyl group.

8. A method of producing the silicone resin molded product according to claim 6, said method comprising radically copolymerizing the silicone resin composition by either heating the silicone resin composition or irradiating the silicone resin composition with an energy ray.

* * * * *